US012252105B2

(12) United States Patent
Gabara et al.

(10) Patent No.: US 12,252,105 B2
(45) Date of Patent: Mar. 18, 2025

(54) HILL-HOLD ASSIST

(71) Applicant: FORD GLOBAL TECHNOLOGIES, LLC, Dearborn, MI (US)

(72) Inventors: Anna Katherine Gabara, Alpena, MI (US); Markian Oleh Diakiw, Livonia, MI (US); Richard Grubke, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1079 days.

(21) Appl. No.: 17/120,875

(22) Filed: Dec. 14, 2020

(65) Prior Publication Data

US 2022/0185245 A1 Jun. 16, 2022

(51) Int. Cl.
*B60T 7/12* (2006.01)
*B60T 7/04* (2006.01)

(52) U.S. Cl.
CPC ............. *B60T 7/122* (2013.01); *B60T 7/042* (2013.01); *B60T 2201/06* (2013.01); *B60T 2220/04* (2013.01)

(58) Field of Classification Search
CPC ............... B60T 7/122; B60T 2201/06
See application file for complete search history.

(56) References Cited

U.S. PATENT DOCUMENTS

| | | | | |
|---|---|---|---|---|
| 4,618,040 A * | 10/1986 | Honma | ............... | B60T 7/122 192/222 |
| 5,137,127 A * | 8/1992 | Braun | ............... | B60W 30/18118 477/196 |
| 5,806,938 A * | 9/1998 | Stumpe | ............... | B60T 8/00 303/166 |
| 5,984,429 A * | 11/1999 | Nell | ............... | B60T 8/4275 303/155 |
| 6,502,908 B1 * | 1/2003 | Mueller | ............... | B60W 30/17 303/191 |
| 6,679,810 B1 * | 1/2004 | Boll | ............... | B60W 30/1819 477/194 |
| 7,542,837 B2 * | 6/2009 | Messner | ............... | B60T 7/12 303/191 |

(Continued)

FOREIGN PATENT DOCUMENTS

| | | | |
|---|---|---|---|
| CN | 106976411 A | 7/2017 | |
| DE | 4332459 A1 * | 3/1995 | ............... B60T 7/122 |
| EP | 2570313 A1 | 3/2013 | |

*Primary Examiner* — Bradley T King
(74) *Attorney, Agent, or Firm* — Vincent Mastrogiacomo; Brooks Kushman P.C.

(57) ABSTRACT

A vehicle includes a powertrain having a powerplant and a transmission. The transmission has an input shaft operably coupled to the powerplant and an output shaft operably coupled to driven wheels. A vehicle controller is programmed to, in response to a brake pedal being applied, a speed of the output shaft being less than a threshold speed, and a position of an accelerator pedal being less than a threshold position, automatically engage friction brakes regardless of road grade and continue engagement of the friction brakes despite subsequent release of the brake pedal such that the friction brakes are engaged to hold the vehicle stationary independent of the road grade. The controller is further programmed to release the friction brakes in response to a position of the accelerator pedal being greater than a second threshold position.

19 Claims, 2 Drawing Sheets

(56) References Cited

U.S. PATENT DOCUMENTS

| | | | |
|---|---|---|---|
| 10,407,067 B2 | 9/2019 | Henel et al. | |
| 2003/0214185 A1* | 11/2003 | Kinder | B60T 11/103 |
| | | | 188/DIG. 2 |
| 2003/0214186 A1* | 11/2003 | Kinder | B60T 7/122 |
| | | | 303/192 |
| 2005/0137767 A1* | 6/2005 | Goebels | B60T 8/3675 |
| | | | 280/5.502 |
| 2010/0168974 A1* | 7/2010 | Bradley, IV | B60T 8/1708 |
| | | | 303/5 |
| 2017/0015327 A1 | 1/2017 | Henel et al. | |
| 2017/0210368 A1* | 7/2017 | Svensson | B60T 8/4072 |
| 2018/0237016 A1* | 8/2018 | Khafagy | B61H 1/00 |

* cited by examiner

HILL-HOLD ASSIST

TECHNICAL FIELD

This disclosure relates to hill-hold assist systems and more specifically to hill-hold assist systems that operate independently of road grade.

BACKGROUND

Launching a vehicle from rest on an uphill road grade can be challenging. When launching, the driver must coordinate releasing the brake with applying the accelerator pedal so that rollback of the vehicle is avoided. This may involve controlling the brake pedal with the left foot while controlling the accelerator pedal with the right foot. When done correctly, this technique may allow the driver to launch the vehicle without rollback.

SUMMARY

According to one embodiment, a vehicle includes a powertrain having a powerplant and a transmission. The transmission has an input shaft operably coupled to the powerplant and an output shaft operably coupled to driven wheels. A vehicle controller is programmed to, in response to a brake pedal being applied, a speed of the output shaft being less than a threshold speed, and a position of an accelerator pedal being less than a threshold position, automatically engage friction brakes regardless of road grade and continue engagement of the friction brakes despite subsequent release of the brake pedal such that the friction brakes are engaged to hold the vehicle stationary independent of the road grade. The controller is further programmed to release the friction brakes in response to a position of the accelerator pedal being greater than a second threshold position.

According to another embodiment, a system for hill-hold assist of a motor vehicle includes an air-pressure sensor configured to output an air-pressure signal indicative of an air pressure of an air-brake system, a brake-pedal position sensor configured to output a brake-pedal signal indicative of a brake-pedal position, and an accelerator-pedal position sensor configured to output an accelerator-pedal signal indicative an accelerator-pedal position. A controller is programmed to, in response to the brake-pedal position exceeding a threshold, the air-pressure signal exceeding a threshold pressure, and the accelerator-pedal position being less than a threshold, automatically engage friction brakes regardless of road grade and continue engagement of the friction brakes despite subsequent change in the brake pedal position such that the friction brakes are engaged to hold the vehicle stationary independent of the road grade. The controller is further programmed to release the friction brakes in response to the accelerator pedal position exceeding the threshold.

According to yet another embodiment, a method of operating hill-hold assist in a vehicle includes engaging friction brakes to hold a vehicle stationary in response to hill-hold assist being activated regardless of road grade when vehicle speed is zero, a brake pedal is applied, and an accelerator pedal position is less than a first threshold; continuing to apply the brakes despite release the brake pedal during the hill-hold assist; and releasing the friction brakes in response to hill-hold assist being deactivated when the accelerator pedal position exceeds a second threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
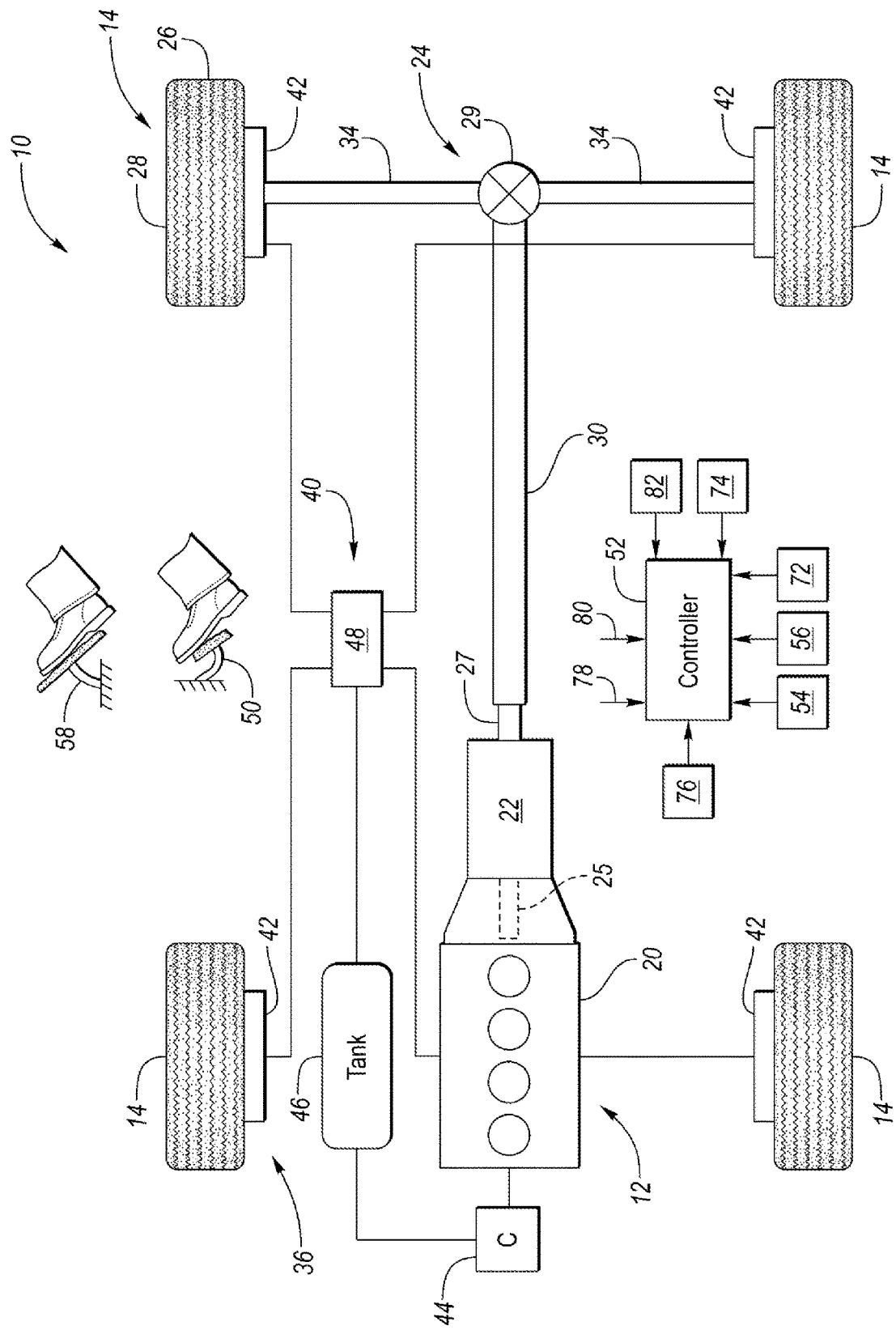
FIG. 1 is a schematic diagram of an example vehicle having a hill-hold assists system.

Referring to FIG. 1, a vehicle 10 may be a motor vehicle like a truck, a car, an SUV, or the like. The vehicle 10 may include a trailer for transporting cargo in one or more embodiments. The vehicle 10 may have a powertrain 12 that provides torque to one or more wheel assemblies 14 to propel the vehicle 10. The wheel assemblies 14 may include at least one wheel 28 that supports at least one tire 26. In the illustrated embodiment, each will assembly 14 includes a single tire and a single wheel, however, in other embodiments, a wheel assembly may include two wheels and two tires (e.g., a "dually"). The vehicle 10 is shown with four wheel assemblies 14, however, the vehicle 10 may include six wheel assemblies in other embodiments, e.g., a three axle vehicle. The powertrain 12 may include an engine 20, a transmission 22, and at least one driven axle 24. The engine 20 may provide power or a propulsion torque used to rotate one or more wheel assemblies 14 to propel the vehicle 10. In at least one embodiment, the engine 20 may be configured as an internal combustion engine that may be adapted to combust any suitable type of fuel, such as gasoline, diesel, or hydrogen.

The transmission 22 may include an input shaft 25 that is coupled to a crankshaft of the engine 20 and an output shaft 27 that is coupled to a driveshaft 30. The transmission 22 may be of any suitable type, such as a multi-gear "step ratio" transmission as is known by those skilled in the art. As used herein, the term transmission may also encompass or include a transfer case that may provide multi-wheel drive or all-wheel drive capability.

The driven axle 24 includes a differential 29 is driveably connected to the wheel assemblies 14 by axles 34, e.g., halfshafts. The vehicle 10 may also include a front axle 36 that may be configured to steer the vehicle 10. The front axle 36 may or may not be configured as a drive axle that provides torque to at least one associated wheel assembly 14.

A brake system 40 may be provided with the vehicle 10. The brake system 40 may include friction brakes 42 or friction braking system. A friction brake 42, which may also be called a service brake, is configured to slow or inhibit rotation of at least one associated wheel assembly 14. Each friction brake 42 may be disposed proximate a wheel assembly 14 and may include at least one brake pad assembly and a brake friction member. A brake pad assembly may have a friction material, which may also be called a brake lining, that may engage the brake friction member during vehicle braking and may be spaced apart from the brake friction member when the friction brake 42 is not being applied. More specifically, a brake pad assembly may engage the brake friction member when braking is requested or commanded such that the frictional force exerted by the brake pad assembly against the brake friction member retards or slows rotation of its associated wheel assembly 14. The brake pad assembly may be spaced apart from the brake friction member when braking is not requested or applied. As such, the brake friction member may rotate with a wheel assembly 14 and with respect to a brake pad assembly when braking is not requested.

The friction brake 42 may have any suitable configuration. For example, a friction brake 42 may be configured as a drum brake or a disc brake. In a disc brake configuration, the brake friction member may be configured as a rotor and first and second brake pad assemblies may be configured to engage opposite sides of the rotor to slow the rotation of a wheel assembly 14. In a drum brake configuration, the brake friction member may be a brake drum that may extend completely around first and second brake pad assemblies that may be configured to engage the brake drum to slow rotation of a wheel assembly 14. The brake drum may be disposed between a wheel assembly 14 and a wheel hub assembly that may rotatably support the wheel assembly 14.

The friction brake 42 may use any suitable actuator or actuation system to actuate a brake pad assembly. For example, a pneumatic, hydraulic, electrical, or electromechanical actuation system may be employed as are known by those skilled in the art. In FIG. 1, the friction brake 42 has a pneumatic configuration commonly referred to as an air-brake system. The air-brake system includes a compressor that pressurizes air into a pressurized gas source 46. The compressor 44 may be powered by the engine 20 via a belt drive, the crankshaft, a power takeoff unit, etc.

The pressurized gas source 46 is in fluid communication with a brake control unit 48. The pressurized gas source 46 may be configured to supply and/or store a volume of a pressurized gas or pressurized gas mixture, such as air and/or nitrogen. The pressurized gas source 46 may be disposed on the vehicle 10 and may be configured to provide a pressurized gas or pressurized gas mixture at a pressure that is sufficient to actuate one or more friction brakes 42. The pressurized gas source 46 may also provide pressurized gas to other vehicle components. The pressurized gas source may be one or more storage tanks configured to hold compressed air.

The brake control unit 48 may be fluidly connected to the pressurized gas source 46. The brake control unit 48, which may also be called a brake pneumatic unit (BPU) when a pneumatic friction brake actuation system is employed, may control operation of the friction brakes 42 by controlling actuation of a brake pad assembly or engagement and disengagement of a brake pad assembly with the brake friction member. For example, the brake control unit 48 may include one or more valves that may control the flow of pressurized gas from the pressurized gas source 46 to and/or from the friction brakes 42 to advance and retract the associated brake pad assemblies.

A driver controls the brake system 40 with a brake pedal 50. The brake pedal 50 may be mechanically linked to the brake control unit 48 or, may be in electric communication with a controller 52. Here, the brake pedal 50 includes a brake pedal sensor 54 configured to output a signal indicative of the brake pedal position to the controller 52. The controller 52 is in electric communication with the brake control unit 48 and is configured to open and close valves within the control unit 48 to apply brakes 42 of one or more of the wheel assemblies 14. The controller 52 may be configured to engage the brakes 42 based on input from the driver via the brake pedal 50 and also automatically based on sensed conditions in operating modes.

In one or more embodiments, the brake pedal sensor 54 may be provided to detect a braking command or a brake torque command that may be provided by a vehicle driver or vehicle operator. For example, the brake pedal sensor 54 may detect the position of the brake pedal 50 or the position or operating state of a component connected to or operated by the brake pedal, such as a treadle valve that may modulate a control fluid pressure that may be provided to a relay valve that may control the supply of fluid to one or more friction brakes 42 or friction brake actuators. Alternatively, the brake pedal sensor 54 may be configured as a pressure sensor that may detect fluid pressure that may directly or indirectly control a brake actuator or braking of the vehicle 10. The detected position of the brake pedal and/or detected pressure may be used to control the signal provided to the controller 52.

The vehicle 10 also includes an accelerator pedal 58 that controls a driver-demanded torque to the powertrain 12. The accelerator pedal 58 includes an associated sensor 56 configured to output a signal to the controller 52 that is indicative of an accelerator pedal position. The controller 52 is programmed to receive the accelerator pedal position and calculate a driver-demanded torque that is then commanded to the powertrain 12 to propel the vehicle accordingly.

A wheel speed sensor 72 may be provided to detect or provide data indicative of a rotational speed of a wheel assembly 14 or wheel 28. The wheel speed sensor 72 may be of any suitable type and may be configured to detect the rotation speed of a wheel assembly 14 or associated wheel axle 34. Data from the wheel speed sensor 72 may also be used to determine a distance of travel of the vehicle 10. For instance, distance of travel may be based on tire size (e.g., tire diameter) and the rotational distance or number of revolutions detected by the wheel speed sensor 72. In at least one embodiment, a wheel speed sensor 72 may be associated with each wheel assembly 14 or wheel axle 34, such as may be provided with an anti-lock brake (ABS) system, traction control system, and/or electronic stability control (ESC) system. As such, the wheel speed sensor 72 may detect wheel slip or unexpected rotation of a wheel assembly 14 in a manner known by those skilled in the art.

A vehicle speed sensor 74 may also be provided to detect or provide data indicative of a speed of the vehicle 10. The vehicle speed sensor 74 may be separate from the wheel speed sensor 72 and may be provided with a drivetrain component, such as the transmission 22 or transaxle, driveshaft 30, or an axle assembly shaft to detect vehicle speed based on the rotation speed of a drivetrain component. The vehicle speed sensor 74 may also be a virtual sensor. For example, the vehicle speed sensor 74 may employ data that may be wirelessly transmitted to the vehicle 10, such as data that may be provided to a navigation system or provided by a global positioning system (GPS) or the like to calculate the speed of the vehicle 10.

The transmission 22 may include one or more speed sensors in electric communication with the controller 52. For example, the speed sensor 76 may be configured to measure a rotational speed of the transmission output shaft 27 and output a signal indicative of the transmission output shaft speed to the controller 52. The transmission 22 may also be configured to output a signal 78 indicative of a drive mode of the transmission. Example drive modes include PARK, REVERSE, DRIVE, NEUTRAL, LOW, and the like. The controller may also receive a signal 80 that is indicative of an ignition status, e.g., OFF, ACCESSORY, and RUN. The brake system 40 may include one or more pressure sensors 82 that measure the pressure of the compressed air and output a signal indicative of the sensed air pressure to the controller 52.

The controller 52 may be provided to monitor and control various components and systems of the vehicle 10. For example, the controller 50 may be electrically connected to or communicate with components of the drivetrain 12, such as the engine 20 and transmission 22, to monitor and control their operation and performance. The controller 52 may also monitor and control the brake system 40. For example, the controller 52 may monitor and control the amount of brake torque provided by the friction brakes 42 and may control operation of the brake control unit 48. As such, the controller 52 may cooperate with the brake system 40 provide antilock braking or antilock brake system (ABS) functionality, traction control functionality, hill-hold assist, and/or electronic stability control (ESC) functionality. For simplicity, a single controller is shown in FIG. 1; however, it is contemplated that multiple control modules or controllers or a distributed control architecture may be provided with the vehicle 10. As used herein, any reference to "a controller" refers to one or more controllers. In addition, the controller 52 may also process input signals or data from various input devices or sensors as described above.

Controller 52 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

During the course of driving, it may be necessary for a vehicle to stop on an uphill road grade. When this happens, the driver must carefully launch the vehicle to prevent rollback. (Rollback is when a vehicle unintentionally travels in the reverse direction. Launch is when a vehicle is accelerating from standstill.) A driver may mitigate rollback by simultaneously operating the brake pedal 50 and the accelerator pedal 58 so that the brakes are maintained until powertrain torque is sufficient to overcome the force of gravity and the weight of the vehicle to propel the vehicle forward from standstill.

Hill-hold assist is an automated vehicle feature designed to mitigate rollback when the vehicle is on an uphill grade and/or prevent unintentional forward movement when on a downhill grade. Hill-hold assist automatically engages the friction brakes 42 to hold the vehicle stationary regardless of road grade and the engagement state of the brake pedal. Hill-hold assist simplifies an uphill launch for the driver by maintaining application of the brakes while the vehicle builds sufficient torque and then automatically releasing the brakes at the appropriate time based on the driver-demanded torque and/or the accelerator pedal position so that the vehicle only travels forward without rollback.

Some hill-hold assist systems operate based on a sensed road grade. For example, the hill-hold assist may only activate when the road grade is beyond a threshold. Such systems may determine the road grade from sensed data, such as an accelerometer. The hardware and computing power associated with determining the road grade are an added cost. These costs can be eliminated by removing road grade from the operating parameters of the hill-hold assist.

While rollback is most pronounced on steep uphill grades, it can occur on any grade other than flat. Therefore, it may be advantageous to activate hill-hold assist regardless of the road grade from both cost and operational perspectives. In some embodiments, the vehicle 10 may include an accelerometer and road-grade determining software that are used for vehicle functionalities other than hill-hold assist.

Rather than relying on road grade for the determining activation or deactivation of the hill-hold assist, the system may use the brake-pedal position, the air pressure of the braking system, the brake pedal depression time, the vehicle speed, the ignition state, the accelerator-pedal position, the transmission mode, the transmission output shaft speed, the proximity to a previous hill-hold assist event, and the determination of valid CAN signals. If the signals and sense conditions indicate that the vehicle is stopped, hill-hold assist is activated. When hill-hold assist is activated, the controller 52 commands engagement of the friction brakes 42. This may include operating the control unit 48 to route pressurized air to the brake assemblies 14 in order to engage the brake pads with the discs or the brake shoes with the brake drums. As conditions change to indicate a desired vehicle launch, the hill-hold assist feature is deactivated and the controller commands release of the friction brakes 42 while simultaneously controlling the powertrain 12 to propel the vehicle 10 forward without rollback.

Figure 2:
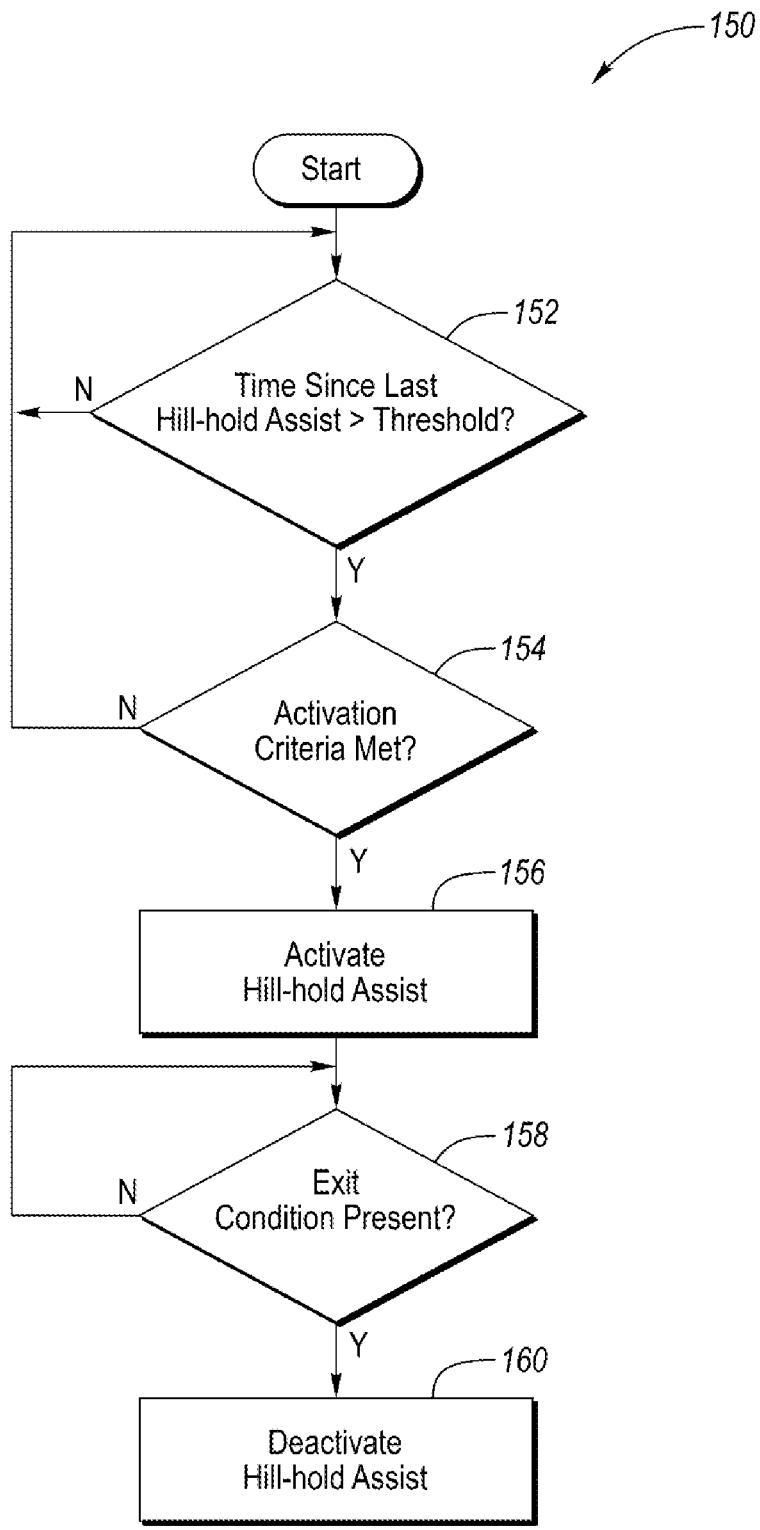
FIG. 2 is a flowchart of an algorithm for operating a hill-assist system.

FIG. 2 is a flow chart 150 of an algorithm for controlling hill-hold assist. Control begins at operation 152 where the controller determines if the time since the last hill-hold assist exceeds the threshold. The threshold may be between 20 to 120 seconds. The timer step 152 mitigates instances of unintentional activation of the hill-hold assist, such as during stop-and-go driving and similar low-speed maneuvers. If yes at operation 152, the controller determines if activation criteria for the hill-hold assist are met at operation 154.

One or more of the following are example criteria for activating the hill-hold assist system. The controller may determine if the air pressure of the brake system exceeds a minimum threshold. In some embodiments, the pressure may be represented by in units of pressure or in units of torque. Therefore, the threshold may be a pressure value or a torque value depending upon the structure of the control system. Obviously, this determination is only for vehicles that include air brakes. If the vehicle includes hydraulic brakes, this criterion is not used. At operation 154, the controller may determine if the brake pedal was applied and if so for how long before being released. If the brake pedal was applied for a predetermined minimum duration before being released, this criteria may be met. The controller may also receive the vehicle speed signal and determine if the vehicle is stationary, and if so for how long. Once the vehicle is stationary for a predetermined period of time, this criterion may be met. The controller may further detect or receive the ignition state. If the ignition state is in RUN, this criteria on may be met. The controller may also receive the accelerator-pedal position signal to determine if the pedal position is less than a threshold, e.g. 5%. If yes, this criterion may be met. The controller may also receive the transmission mode, and if the mode is in DRIVE, this criterion may be met. The controller may also monitor the speed of the transmission output shaft and compare it to a threshold. If the transmission output shaft speed is less than a threshold, e.g., 2 to 10 RPM, this criterion may be met. The controller may also determine that the appropriate CAN signals are present, and if no, this criteria not met.

It is to be understood that all or only some of the above-described criteria may be used at operation 154 to determine if the hill-hold assist should be activated. In one embodiment, the hill-hold assist is activated in response to the brake pedal being applied, a speed of the output shaft being less than a threshold speed, and a position of the accelerator pedal being less than a threshold position. The hill-hold assist may be activated further in response to the vehicle being stationary for a threshold time, an air-brake pressure exceeding a threshold pressure, the transmission being in DRIVE, and/or the ignition state being in RUN. In another embodiment, the activation criteria are met in response to the brake-pedal position exceeding a threshold (this is one example way of determining that the brake pedal is applied; here, the threshold is a low value), the air-pressure signal exceeding a threshold pressure, and the accelerator-pedal position being less than a threshold. This allows for the activation of the hill-hold assist regardless of road grade. In a further embodiment, the criteria are met when vehicle speed is zero, a brake pedal is applied, the road grade is unknown, and an accelerator pedal position is less than a threshold. These are of course just examples and any combination of the above described criteria may be used to determine whether or not to activate hill-hold assist.

If yes at operation 154, control passes operation 156 and the controller activates hill-hold assist. The activation of hill-hold assist may trigger the controller or one or more other controllers to send and receive signals to command the ABS module or other control module to engage the braking system. In the above illustrated air-brake system, this may include operating the valves of the brake control module 48 to route pressurized air to the brakes. If no at operation 154, hill-hold assist is not activated.

Hill-hold assist will remain active to maintain the vehicle in a stationary position until one or more exit conditions are present. Example exit conditions include depression of the accelerator pedal beyond a threshold (this threshold may be the same as the threshold used above to determine activation or may be a different threshold), speed of the output shaft exceeding a threshold (this threshold may be the same as the threshold used above to determine activation or may be a different threshold), the ignition status changing from RUN to OFF or ACCESSORY, vehicle speed exceeding a threshold, the transmission being shifted out of DRIVE, and the loss of one or more CAN signals for a threshold period of time. Hill-hold assist may be deactivated in response to any one of these exit conditions being sensed. If the controller determines that one or more of these conditions are present at operation 158, control passes operation 160 and the controller deactivates hill hold assist. The friction brakes are released in response to the hill hold assist being deactivated so that the vehicle may be propelled forward.

The controls 150 are independent of any road grade determination and therefore can be executed when the road grade is unknown. This eliminates the need for expensive additional sensors and computing power.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a powertrain including a powerplant and a transmission having an input shaft operably coupled to the powerplant and an output shaft operably coupled to driven wheels; and
   a controller programmed to:
      in response to (i) a brake pedal being applied, (ii) a speed of the output shaft being less than a threshold speed, (iii) a position of an accelerator pedal being less than a first threshold position, and (iv) a time since last hill-hold assist engagement being greater a time threshold, automatically engage friction brakes regardless of road grade and continue engagement of the friction brakes despite subsequent release of the brake pedal such that the friction brakes are engaged to hold the vehicle stationary independent of the road grade, and
      release the friction brakes in response to a position of the accelerator pedal being greater than a second threshold position indicative of the powertrain producing sufficient torque to inhibit rollback.

2. The vehicle of claim 1, wherein the threshold speed is between one and four revolutions per second, inclusive.

3. The vehicle of claim 1, wherein the controller is programmed to automatically engage the friction brakes further in response to the vehicle being stationary for a threshold time.

4. The vehicle of claim 1, wherein the controller is programmed to automatically engage the friction brakes further in response to an air-brake pressure exceeding a threshold pressure.

5. The vehicle of claim 1, wherein the controller is programmed to automatically engage the friction brakes further in response to the transmission being in DRIVE.

6. The vehicle of claim 1, wherein the controller is further programmed to, release the friction brakes further in response to the speed of the output shaft exceeding the threshold.

7. The vehicle of claim 1 further comprising an air-braking system including a compressor, a tank, an air line connected between the friction brakes and the tank, and a valve configured to regulate pressure in the air line, wherein the automatically engage the friction brakes includes actuating the valve to route pressurized air to the friction brakes.

8. The vehicle of claim 7, wherein the controller is programmed to automatically engage the friction brakes further in response to an air pressure within the tank exceeding a threshold pressure.

9. The vehicle of claim 1, wherein the powerplant is an engine.

10. A system for hill-hold assist of a motor vehicle comprising:
   an air-pressure sensor configured to output an air-pressure signal indicative of an air pressure of an air-brake system;
   a brake-pedal position sensor configured to output a brake-pedal signal indicative of a brake-pedal position;
   an accelerator-pedal position sensor configured to output an accelerator-pedal signal indicative an accelerator-pedal position; and
   a controller programmed to:
   in response to (i) the brake-pedal position exceeding a threshold, (ii) the air-pressure signal exceeding a threshold pressure, and (iii) the accelerator-pedal position being less than a first threshold, (iv) a time since last hill-hold assist engagement being greater a time threshold, automatically engage friction brakes regardless of road grade and continue engagement of the friction brakes despite subsequent change in the brake pedal position such that the friction brakes are engaged to hold the vehicle stationary independent of the road grade, and
   release the friction brakes in response to the accelerator pedal position exceeding a second threshold position indicative of the powertrain producing sufficient torque to inhibit rollback.

11. The system of claim 10 further comprising a speed sensor configured to output a signal indicative of a vehicle speed, and wherein the controller is programmed to automatically engage the friction brakes further in response to the vehicle speed being zero for a threshold time.

12. The system of claim 10 further comprising a speed sensor configured to output a signal indicative of a transmission output shaft speed, and wherein the controller is programmed to automatically engage the friction brakes further in response to the transmission output shaft speed being less than a threshold.

13. The system of claim 12 further comprising a speed sensor configured to output a signal indicative of a vehicle speed, and wherein the controller is programmed to activate automatically engage the friction brakes further in response to the vehicle speed being zero for a threshold time.

14. The system of claim 10 further comprising an air-braking system including the friction brakes, the air-pressure sensor, a compressor, a tank, an air line connected between the friction brakes and the tank, and a valve configured to regulate pressure in the air line, wherein the automatically engage the friction brakes includes actuating the valve to route pressurized air to the friction brakes.

15. A method of operating hill-hold assist in a vehicle, the method comprising:
   engaging friction brakes to hold a vehicle stationary in response to hill-hold assist being activated regardless of road grade when vehicle speed is zero, a brake pedal is applied, a time since last hill-hold assist engagement is greater a time threshold, and an accelerator pedal position is less than a first threshold; and
   releasing the friction brakes in response to hill-hold assist being deactivated when the accelerator pedal position exceeds a second threshold position indicative of the powertrain producing sufficient torque to inhibit rollback.

16. The method of claim 15, wherein the hill-hold assist is activated further when a transmission output shaft speed is less than a third threshold and the road grade is unknown.

17. The method of claim 16, wherein the hill-hold assist is deactivated further when the speed of the output shaft exceeds the third threshold.

18. The method of claim 15, wherein the hill-hold assist is activated further when a pressure of an air brake system exceeds a threshold pressure.

19. The method of claim 15, wherein the hill-hold assist is activated further when a transmission of the vehicle is in DRIVE.

* * * * *